(12) United States Patent
Hristake

(10) Patent No.: US 6,193,642 B1
(45) Date of Patent: Feb. 27, 2001

(54) MULTIPLE-AXIS CENTRIFUGATION BUCKET FOR CENTRIFUGAL TRANSFER BETWEEN MICROWELL PLATES

(75) Inventor: Val Hristake, Maplewood, NJ (US)

(73) Assignee: Pharmacopeia, Inc., Princeton, NJ (US)

( * ) Notice: Subject to any disclaimer, the term of this patent is extended or adjusted under 35 U.S.C. 154(b) by 0 days.

(21) Appl. No.: 09/493,463

(22) Filed: Jan. 28, 2000

(51) Int. Cl.[7] .................................................. B04B 5/02
(52) U.S. Cl. ................................. 494/20; 494/37
(58) Field of Search .............................. 494/16, 19, 20, 494/33, 37; 422/72

(56) References Cited

U.S. PATENT DOCUMENTS

| | | | |
|---|---|---|---|
| 2,604,261 | * | 7/1952 | Silverstolpe . |
| 3,028,075 | * | 4/1962 | Blum . |
| 3,674,198 | * | 7/1972 | Eberle . |
| 5,816,998 | * | 10/1998 | Silverstolpe et al. ............ 494/20 |

* cited by examiner

Primary Examiner—Charles E. Cooley
(74) Attorney, Agent, or Firm—Law Offices of Peter H. Priest, PLLC (57) ABSTRACT

An improved centrifugation bucket providing two axes of rotation for a pair of multi-well plates. The centrifugation bucket is adapted to be used with a centrifuge in order to effect material transfer between a pair of microwell plates. The centrifugation bucket comprises a yoke adapted to be attached to a rotor arm of a centrifuge, and a platform attached to the yoke. The yoke is adapted to be attached to the centrifuge by a hinge or hinges providing a primary axis of rotation and the platform is attached to the yoke by hinges or other connectors providing a secondary axis of rotation. Multi-well plates may be secured to the platform to allow transfer of materials between the plates. The primary axis of rotation is parallel to the direction of travel of the centrifugation bucket during centrifugation and the secondary axis of rotation is perpendicular to the direction of travel of the centrifugation bucket during centrifugation. The yoke and the platform are free to rotate in response to the forces of centrifugation such that the multi-well plates are nearly normal to the net force of centrifugation.

15 Claims, 10 Drawing Sheets

MULTIPLE-AXIS CENTRIFUGATION BUCKET FOR CENTRIFUGAL TRANSFER BETWEEN MICROWELL PLATES

FIELD OF THE INVENTION

The present invention relates generally to improvements in high throughput assays of chemical compounds, cells, proteins and the like. More particularly, the present invention provides an improved centrifugation bucket for use in a plate to plate transfer apparatus for transferring small volumes of materials from small well plates having a large plurality of wells, such as presently existing 1536-well plates, or for performing separations, filtrations or the like in a similar context.

BACKGROUND OF THE INVENTION

To find lead compounds for drug discovery programs, large numbers of compounds are often screened for their activity as enzyme inhibitors or receptor agonists/antagonists. Large libraries of compounds are needed for such screening. As a result of developments in this field, it is now possible to simultaneously produce combinatorial libraries containing hundreds of thousands of small molecules for screening. With the availability of such libraries, however, has come a need for large scale, rapid screening methods. In the context of these methods, it has proven advantageous to perform a plate to plate transfer employing the 1536-well plate described in PCT Application Ser. No. PCT/US98/00494 entitled Multi-Well Plate, filed Jan. 8, 1998 and incorporated by reference herein, or employing other plates containing a large number of samples in a large number of low volume wells. Such plates are secured in a facing alignment in a centrifugation bucket and centrifuged to effect transfer.

When two plates are secured in a centrifugation bucket, an interstice exists at the contact surface between the plates, providing a possible path for liquid flow between the plates and along the surfaces of the plates. Capillary action contributes to this flow. Also contributing to this flow are force components produced during centrifugation which act parallel to the interstice between the plates. Liquid flow along the surfaces of the plates is highly undesirable because it allows contamination of the contents of one well by liquid lowing from another well, and because it allows loss of material as liquid flows out of the lates through the interstice between the plates.

In a typical centrifugation bucket of the prior art, the centrifugation bucket is mounted on a centrifuge rotor by a hinge, allowing the bucket to pivot about a single axis in response to the forces of centrifugation. This allows the plates to be held parallel to the axis of rotation of the centrifuge once operational speed has been achieved. The only force produced by centrifugation during this time is a force acting normal to the surfaces of the plates. However, during starting and stopping of the centrifuge, tangential force components exist which act parallel to the surfaces of the plates and thus parallel to the interstice between the plates. These forces exist while the centrifuge accelerates from rest to its operating speed, and while the centrifuge decelerates from its operating speed to a resting position, and are produced by changes in rotational speed. The tangential forces tend to produce flow of liquid in the interstice between the plates and parallel to the surfaces of the plates. This presents a risk of contamination and loss of material.

As noted above, a typical centrifugation bucket according to the prior art comprises a yoke which is free to pivot around a single hinge. When the centrifugation bucket is at rest, the yoke is in a resting horizontal position. When the centrifugation bucket is placed in a centrifuge and is accelerated to operating speed, the yoke swings upward under the influence of the centrifugal forces produced by the rotation of the centrifuge, and is held parallel to the axis of rotation by these centrifugal forces. The force produced by centrifugation under these circumstances is the normal force, which acts perpendicular to the plates. However, as the centrifuge is accelerated or decelerated, tangential forces acting parallel to the surfaces of the plates also materialize, and contribute to liquid flow between the plates. Because the centrifugation bucket pivots about a single hinge, it lacks sufficient freedom of movement to respond to both the normal force and the tangential force exerted during the centrifuging process.

There exists, therefore, a need in the art for an improved centrifugation bucket for use in centrifuging multi-well plates, which allows the plates to pivot so as to allow maximization of forces acting perpendicular to the plates and minimization of forces acting parallel to the plates.

Summary of the Invention

A centrifugation bucket according to one aspect of the present invention includes a yoke suitable for attachment to a centrifuge rotor by a first hinge providing a primary axis of rotation. A platform for holding microwell plates is attached to the yoke by a second hinge or connector providing a secondary axis of rotation. The yoke pivots about the primary axis of rotation in response to the normal forces exerted on the centrifugation bucket as the rotor accelerates and decelerates. At the same time, tangential forces act to pivot the platform about the secondary axis of rotation such that force components acting normal to the platform are maximized and other force components are minimized.

A more complete understanding of the present invention, as well as further features and advantages of the invention, will be apparent from the following Detailed Description and the accompanying drawings.

DETAILED DESCRIPTION

Figure 1:
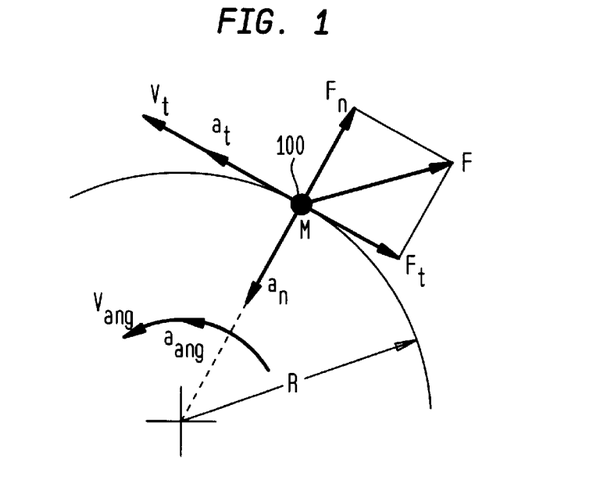
FIG. 1 illustrates the circular movement and acceleration of a mass undergoing an angular acceleration and the forces induced on the mass by the acceleration.

FIG. 1 illustrates the circular movement and acceleration of a mass M 100 which is shown to be moving in a circular orbit. In maintaining the orbit, the mass 100 is undergoing an angular acceleration $a_{ang}$ esulting in an angular velocity $V_{ang}$. The angular acceleration of the mass 100 may also be expressed as a linear acceleration, which can be resolved into two components. The first of these is a normal component $a_n$, which is directed toward the center of the orbit. The change in speed is expressed as the tangential acceleration $a_t$, and produces the tangential velocity $V_t$. The normal acceleration $a_n$ is present at all times during the circular motion of the mass 100. The tangential acceleration $a_t$, however, is present only when the speed of the mass 100 is changing. Once the mass 100 has achieved a constant speed, the tangential acceleration $a_t$ becomes 0.

As the speed of the mass 100 increases, an inertial force F is produced. The inertial force F can be expressed as the resultant of two component forces, a normal force $F_n$ acting directly away from the center of the orbit, and a tangential force $F_t$, acting tangential to the orbit of the mass 100 and opposite to the direction of linear travel of the mass 100. The tangential force component $F_t$ exists only as the speed of the mass 100 is changing. Once the speed of the mass 100 becomes constant, the force $F_t$, drops to 0. When the mass 100 decelerates, the force $F_t$ acts in the direction of travel of the mass 100 during deceleration.

Figure 2:
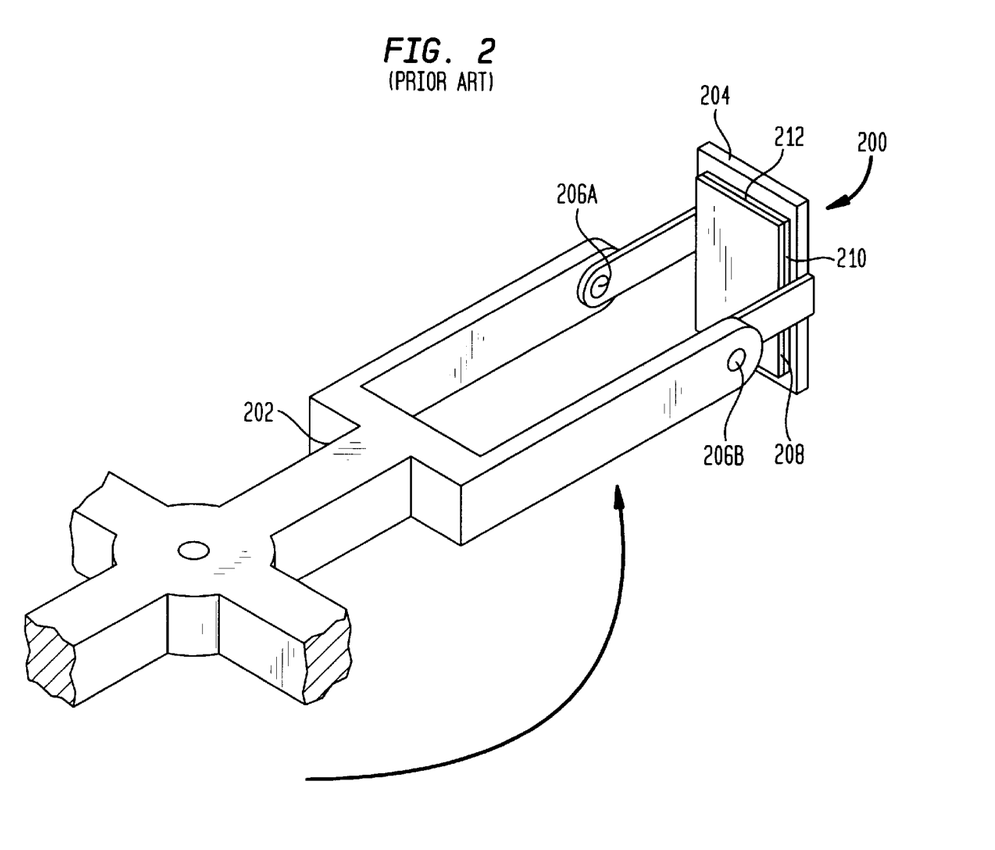
FIG. 2 illustrates a part of a centrifugation bucket of the prior art undergoing an angular acceleration.

FIG. 2 illustrates a part of a prior art centrifuge 200 as centrifugation is accomplished. The centrifuge 200 includes a centrifuge rotor 202 to which a prior art centrifugation bucket 204 is attached on hinges 206A and 206B. The centrifugation bucket 204 supports first and second microwell plates 208 and 210, which are maintained in a facing position. The first plate 208 is a source plate and contains liquid within its wells which will be transferred to the second plate 210 during centrifugation. Due to the small size of the wells, the surface tension of the liquid exerts a force which retains the liquid within the wells in the absence of a countervailing force.

An interstice 212 exists at the plane of contact between the plates 208 and 210. The interstice 212 provides a path for undesired liquid flow in the direction of inertial forces exerted upon liquids in wells in the plates 208 and 210. As noted above, surface tension tends to retain the liquid within the wells; however, if sufficient forces of centrifugation arise, the surface tension will be overcome.

As illustrated here, the centrifugation bucket 204 has achieved sufficient speed to cause it to pivot in response to the normal inertial force arising from the rotation of the rotor 202. The centrifugation bucket 204 has pivoted upward 90 degrees from its original position, so that the plates 208 and 210 are perpendicular to the normal force component $F_n$ acting outwardly from the center of the rotor 202. However, the interstice 212 continues to be oriented along the line of motion of the plates 208 and 210, and provides a path for undesired liquid flow along the line of motion of the plates 208 and 210 once the forces exerted in that direction exceed the forces exerted by surface tension of the liquids within the plates 208 and 210.

Figure 3:
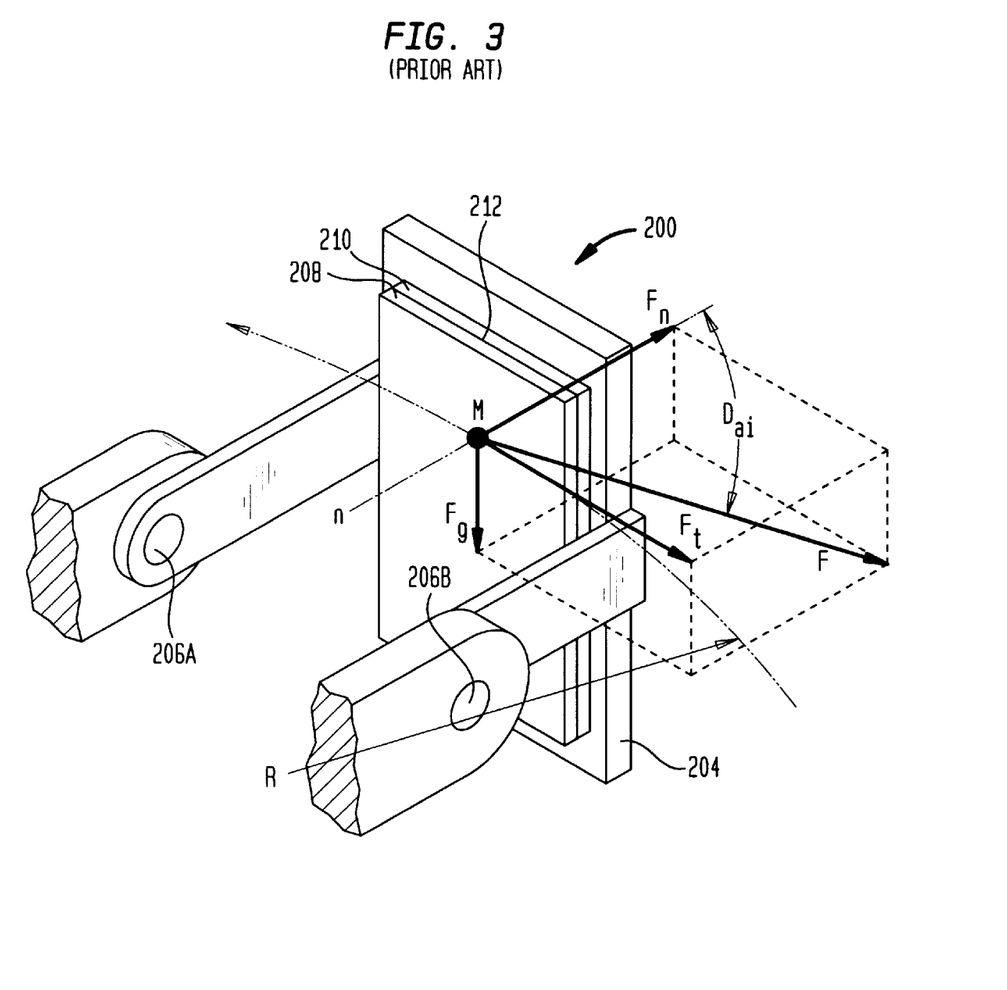
FIG. 3 illustrates forces acting on a mass located in a centrifugation bucket of the prior art which is being subjected to angular acceleration.

FIG. 3 illustrates in greater detail the forces acting on a mass M located in the centrifugation bucket 204 as the centrifuge 200 accelerates to its operating speed. In this discussion, the mass M will be the mass of a liquid such as is commonly contained in a well during a transfer operation. In the situation illustrated in FIG. 3, the centrifuge 200 has already achieved a sufficient speed to cause the centrifugation bucket 204 to pivot upwards so that the plates 208 and 210 are parallel to the axis of rotation. Under these circumstances, the forces on the mass M include the force of gravity $F_g$, which is exerted downward, a normal force $F_n$ acting outwardly from the center of rotation, and a tangential $F_t$, acting along the path of motion of the plates 208 and 210. These components create a net force F. Surface tension and friction exerted between the mass M and the wells of the plates 208 and 210 are sufficient to overcome the force of gravity and because of the orientation of the centrifugation bucket 204, the force $F_n$ tends to drive the mass M toward the plate 210 to effect a transfer from the plate 208 to the plate 210.

The force $F_t$, on the other hand, acts parallel to the plates 208 and 210, and therefore parallel to the interstice 212. Because of the force $F_t$, a significant deviation angle $D_{ai}$ exists between the net force F of centrifugation and the direction normal to the plates 208 and 210. When the force $F_t$ is present, that is, during increases and decreases of the speed of the centrifugation bucket 204, the mass M tends to be driven along the interstice 212.

The tangential force $F_t$ has undesirable effects on liquids within the plates 208 and 210 because the centrifugation bucket 204 has only one axis of rotation and is therefore unable to rotate in response to the tangential force component $F_t$ of the force F. It would be highly desirable to alleviate these undesirable effects. To this end, a centrifugation bucket according to the present invention provides an arrangement to allow the plates 208 and 210 to pivot in order to achieve an orientation which brings the plates 208 and 210 and the interstice 212 perpendicular to the net force resulting from centrifugation. A centrifugation bucket according to the present invention provides a first and a second axis of rotation, so that the transfer plates are able to be oriented normal to the net force of centrifugation.

Figure 4:
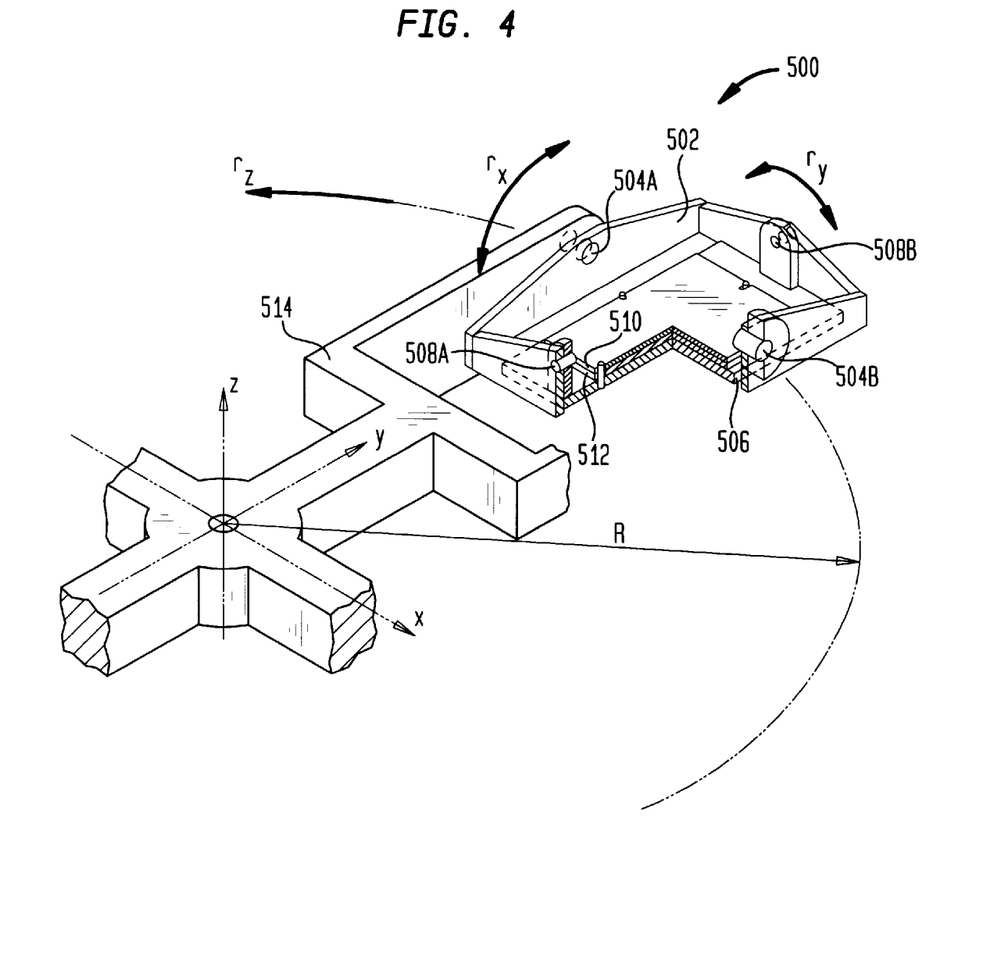
FIG. 4 illustrates a centrifugation bucket according to the present invention.

FIG. 4 illustrates a multiple-axis centrifugation bucket 500 according to the present invention. The centrifugation bucket 500 includes a yoke 502 having a primary axis of rotation, designated here as an x axis of rotation, around first and second hinges 504A and 504B. The primary axis is preferably located at the approximate center of inertia of the yoke. The yoke 502 holds a platform 506 which is connected to the yoke by third and fourth hinges 508A and 508B. The third and fourth hinges 508A and 508B provide the platform 506 with a secondary axis of rotation, designated here as a y axis of rotation. The secondary axis is preferably located at the approximate center of inertia of the platform. The y axis of rotation is independent of and perpendicular to the x axis of rotation of the yoke 502. The platform 506 rotates with the yoke. Therefore the platform possesses two independent axes of rotation. The platform 506 is suitable for supporting the transfer plates 510 and 512, which are similar to the plates 208 and 210 of FIG. 2, during centrifugation. The plate 510 is a source plate and the plate 512 is a target plate. Alternatively, if harvesting of material rather than plate-to-plate transfer is desired, a membrane (not shown) may be substituted for the target plate 512. The centrifugation bucket 500 is shown here as supported on a rotor 514 which rotates around the z axis for centrifugation. During centrifugation, the platform 506 is free to pivot in the direction $r_y$, while the yoke 502 is free to pivot in the direction $r_x$. The platform 506, therefore, can effectively pivot in the directions $r_x$, and $r_y$.

Figure 5:
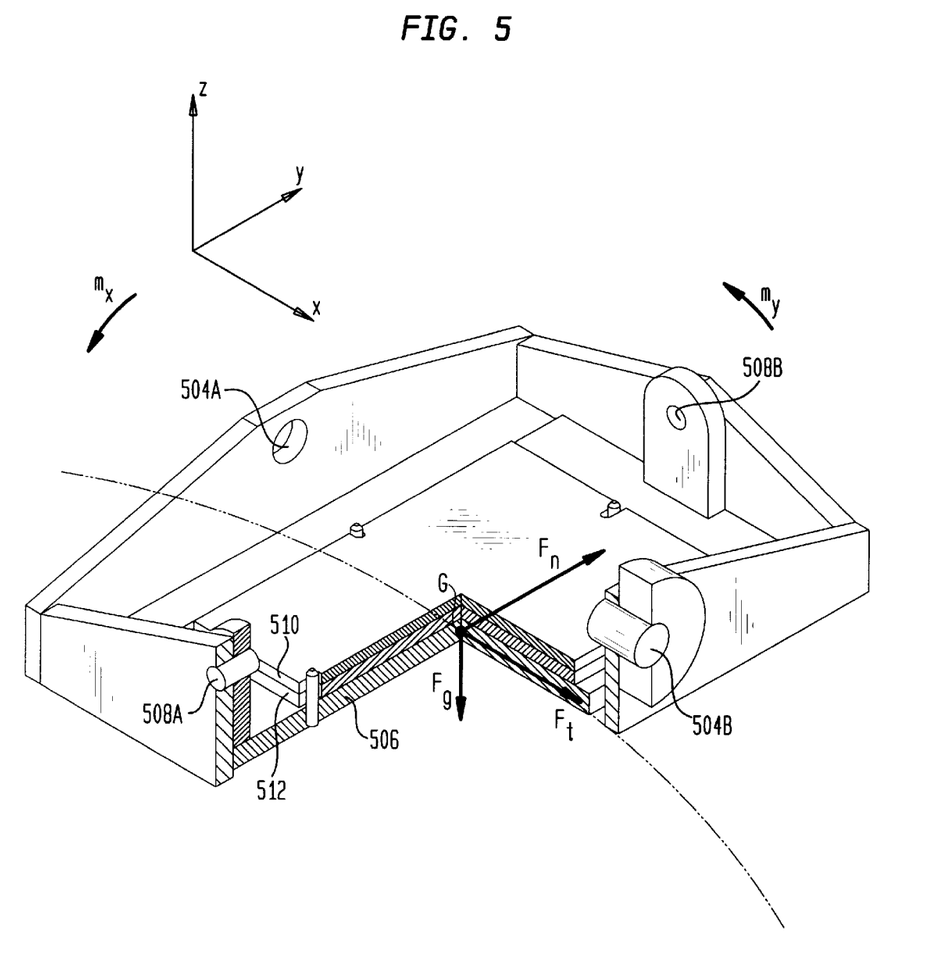
FIG. 5 illustrates a point on a centrifugation bucket according to the present invention and the forces acting thereon when the centrifugation bucket is subjected to angular acceleration.

FIG. 5 illustrates the forces acting on a point G on the platform 506 supporting the plates 510 and 512 during centrifugation. The force of gravity $F_g$ acts on a vector passing through both axes of rotation, and therefore contributes zero rotational momentum. The normal force component $F_n$ produces a rotational momentum $m_x$ around the x axis, that is, around the axis running through the hinges 504A and 504B. The momentum $m_x$ is the product of the force $F_n$ and the distance from the point G to the x axis. The normal force $F_n$ is parallel to the y axis of rotation and therefore does not produce any rotation around this axis. The tangential force $F_t$ produces a rotational momentum $m_y$ around the y axis, that is, around the axis running through the hinges 508A and 508B. The momentum $m_y$ is the product of the tangential force $F_t$ and the distance from the point G to the y axis. The tangential force $F_t$ is parallel to the x axis of rotation and therefore does not produce any rotation around this axis.

Figure 6:
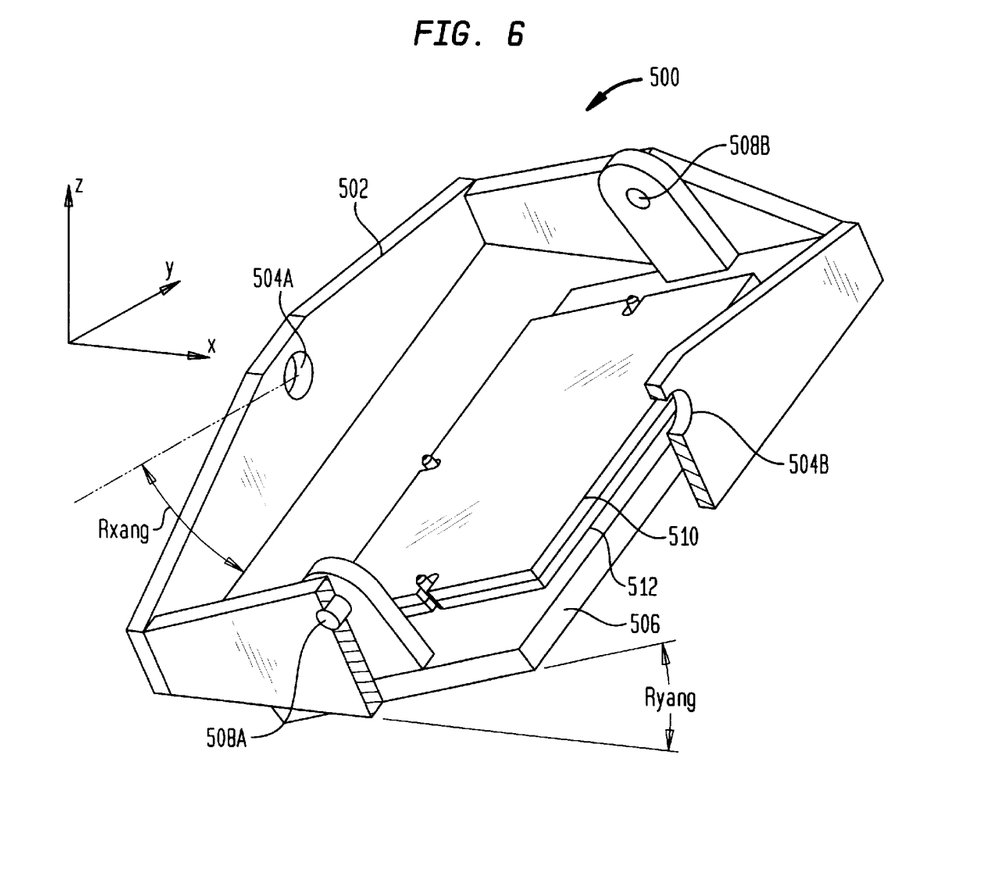
FIG. 6 illustrates a centrifugation bucket according to the present invention, the centrifugation bucket having undergone rotation in response to forces exerted during centrifugation.

FIG. 6 illustrates the centrifugation bucket 500 as it would appear during acceleration. The hinges 504A and 504B are shown as forming the x axis, and the hinges 508A and 508B are shown as forming the y axis. The yoke 502 has pivoted about the x axis with an angle $R_{xang}$, while the platform 506 has pivoted about the y axis with an angle $R_{yang}$. The platform is thus oriented normal to the net force of centrifugation, as are the plates 510 and 512. The net force of centrifugation is thus directed toward the target plate 512, and tends to drive material from the source plate 510 to the target plate 512.

Pivoting of the platform 506 about the y axis typically occurs during the beginning and end of centrifugation, while the rotational speed is changing. Once the centrifugation bucket 500 has achieved operating speed, the platform 506 aligns with the yoke 502 so that the platform 506 is parallel to the yoke 502. This is because the tangential force $F_t$ reaches zero once the speed of the centrifugation bucket 500 becomes constant. Once this occurs, the force $F_n$ is the only remaining force produced by centrifugation, and the platform 506 and yoke 502 are oriented perpendicular to the force $F_n$.

Figure 7:
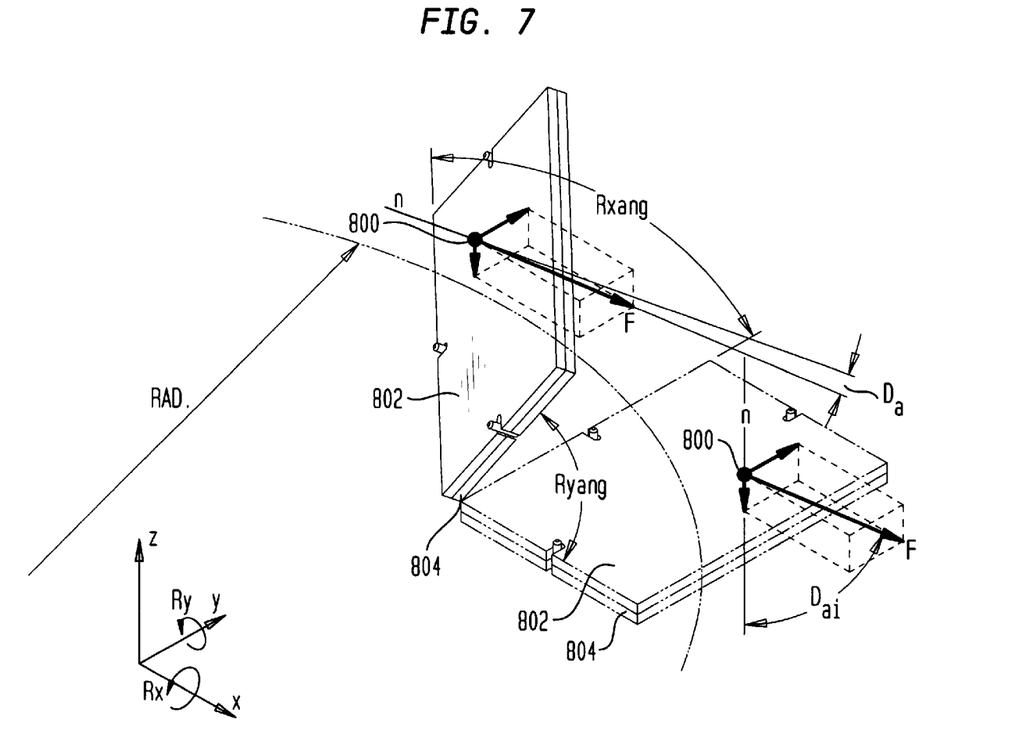
FIG. 7 illustrates the relative directions of forces acting on a droplet between a pair of microwell plates secured on a centrifugation bucket according to the present invention before and after rotation of the centrifugation bucket in response to centrifugation.

FIG. 7 illustrates the orientation of forces upon a droplet 800 which is contained between plates 802 and 804. The droplet 800 and the plates 802 and 804 are shown as they would appear while undergoing the initial stages of centrifugation in a centrifugation bucket (not shown) according to the present invention. The droplet 800 and the plates 802 and 804 are also shown as they would appear once the centrifugation bucket and therefore the plates have pivoted in response to the forces of centrifugation. The plates 802 and 804 as represented at the initial stages of centrifugation are illustrated with dashed lines, and the plates 802 and 804 as represented in a pivoted position induced by the forces of centrifugation are illustrated with solid lines. At the initial stage of centrifugation, the centrifugation bucket, and thus the plates 802 and 804, have not pivoted in response to the forces of centrifugation. The initial deviation angle, that is, the initial angle between the direction of the force vector F, representing the forces of centrifugation, and the direction normal to the plates, is shown here as $D_{ai}$, or the initial deviation angle, and is very great. The droplet 800 is subjected to a force vector F which is nearly parallel to the plate 802. The force vector F therefore tends to drive the droplet 800 along a path between the plates, allowing for deviation from the desired path and resulting cross-contamination and loss of material. However, before the force vector F becomes great enough to overcome the surface tension of liquid within the wells of the plates 802 and 804, the plates 802 and 804 pivot out of their initial orientation.

Once the centrifugation bucket has pivoted in response to the forces of centrifugation, the orientation of the forces acting on the droplet 800 changes with respect to the plates 802 and 804. The force F has the same direction as originally, but the centrifugation bucket has pivoted in response to the force F such that the orientation of the plates 802 and 804 is nearly normal to the force F. The deviation angle, that is, the angle between the force F and the direction normal to the plates 802 and 804 is shown here as $D_a$, and is very small. The force on the droplet 800 therefore tends to drive the droplet 800 from the source plate 802 to the target plate 804 with little or no deviation from the desired path.

Figure 8:
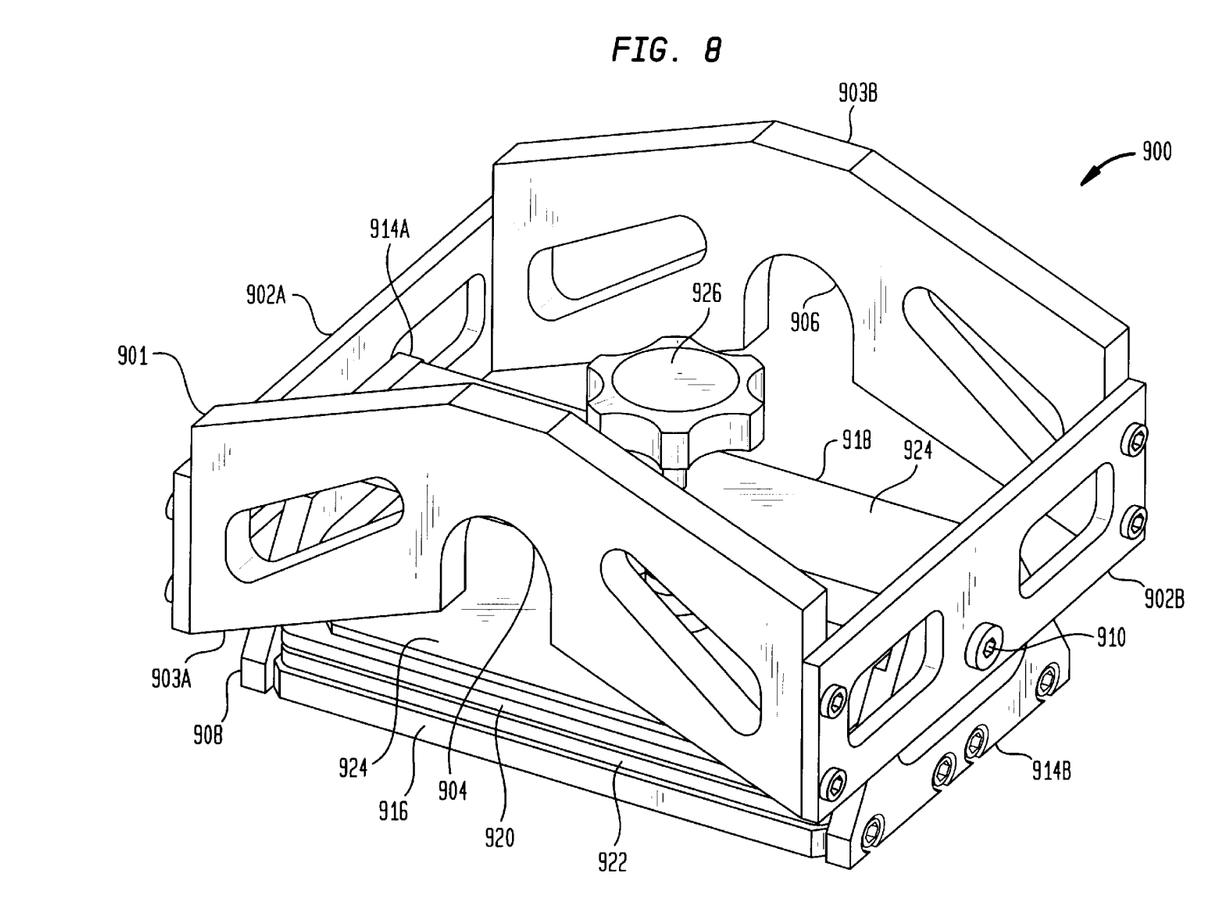
FIG. 8 illustrates an exemplary centrifugation bucket according to the present invention.

FIG. 8 illustrates a multiple-axis centrifugation bucket 900 according to the present invention. The centrifugation bucket 900 includes a yoke 901 comprising first and second transverse elements 902A and 902B, respectively, and first and second longitudinal elements 903A and 903B, respectively. The yoke 901 includes pivot points 904 and 906 suitable for attaching the yoke 901 to a centrifuge rotor (not shown). The pivot points 904 and 906 allow the yoke 901 to pivot around a primary axis of rotation. The centrifugation bucket 900 also includes a plate support assembly 908, connected to the yoke 901 by a pair of shoulder screws, the shoulder screw 910 being visible in this view. The plate support assembly 908 includes brackets 914A and 914B which support a bottom plate 916 and a bridge assembly 918. The bottom plate 916 supports source and target microwell plates 920 and 922, which are pressed against one another and against the bottom plate by a compression plate 924. The pressure exerted by the compression plate is adjusted by tightening or loosening the knob 926.

If a large scale centrifuge is employed, it is also possible to place a self-contained compression assembly (not shown) enclosing plates such as the plate 920 and 922, and secure the compression assembly to the centrifugation bucket 900 by tightening the compression plate 924 against the compression assembly. In this case, compression between the source plate 920 and the target plate 922 would be achieved by the compression assembly. A compression assembly suitable for use with a centrifugation bucket such as the centrifugation bucket 900 is shown in my U.S. patent application Ser. No. 09/410,476, entitled "Compression Assembly for High Throughput Plate to Plate or Plate to Membrane Transfer", filed Sep. 30, 1999 and assigned to the assignee of the present invention.

Figure 9A:
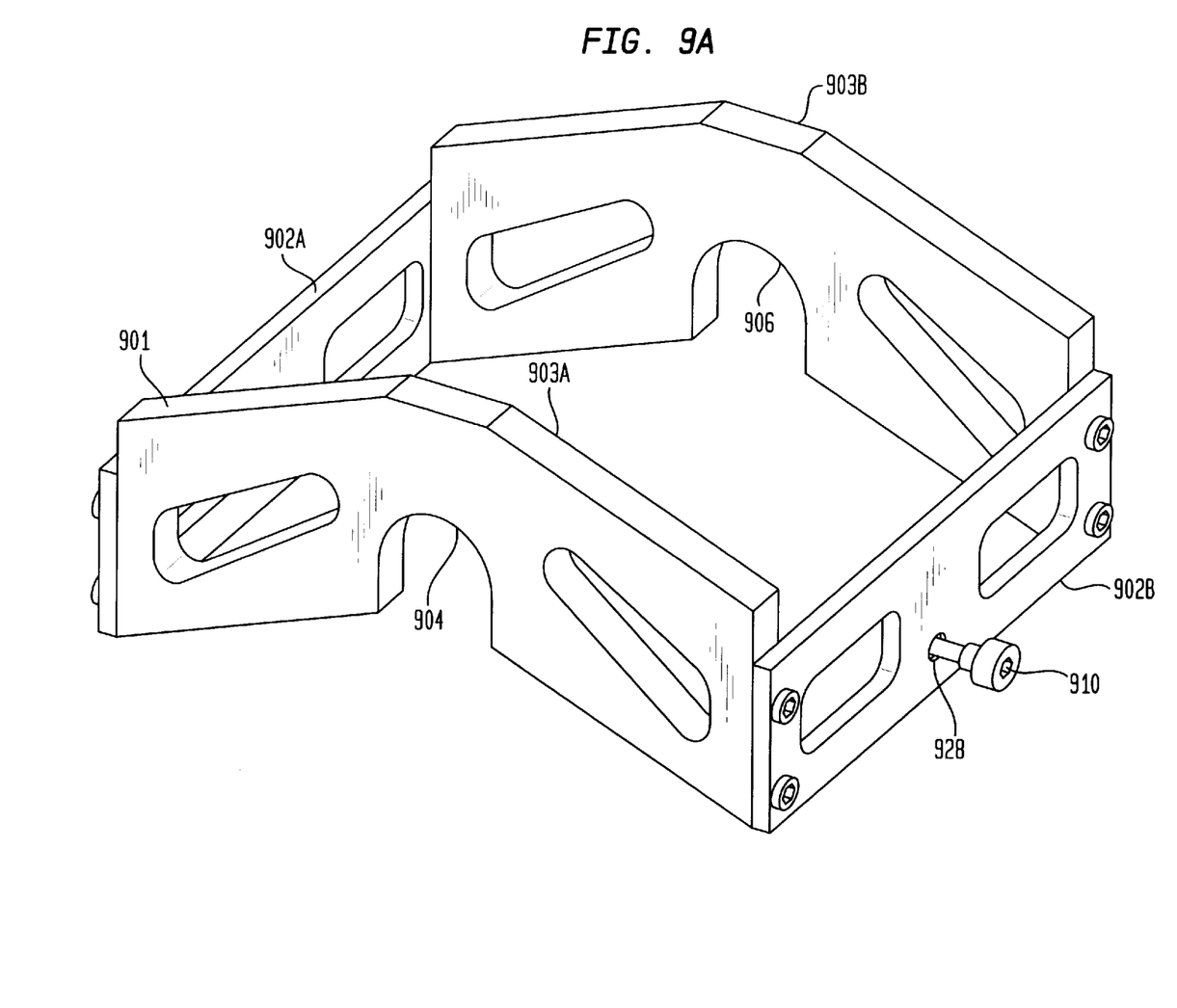
FIG. 9A is view of the yoke section of the centrifugation bucket of FIG. 8.

FIG. 9A provides a more unobstructed view of the yoke 901, detached from the plate support assembly 908. The pivot points 904 and 906 are visible, as are the first and second transverse elements 902A and 902B, as well as the first and second longitudinal elements 903A and 903B. Also visible is the shoulder screw 910, which has been partially removed to allow detachment of the plate support assembly 908. A hole 928 for the shoulder screw 910 is also visible.

Figure 9B:
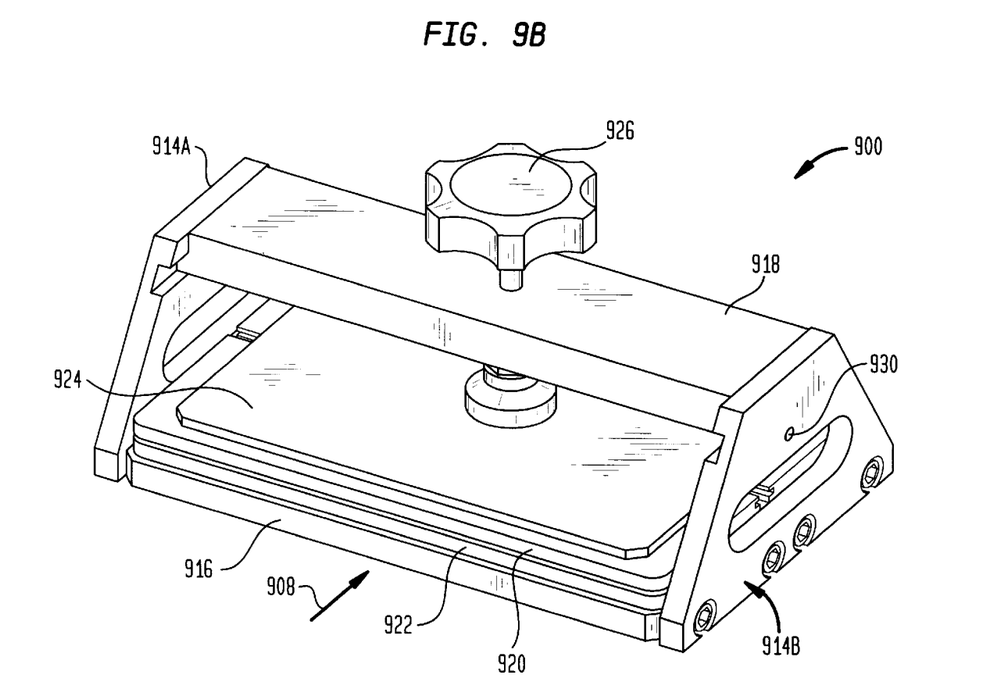
FIG. 9B is a view of the plate support section of the centrifugation bucket of FIG. 8.

FIG. 9B provides a more unobstructed view of the plate support assembly 908, showing the brackets 914A and 914B, the bottom plate 916, the bridge assembly 918, the source and target plates 920 and 922, the compression plate 924 and the knob 926. Also visible is a hole 930 for the shoulder screw 910.

Figure 10:
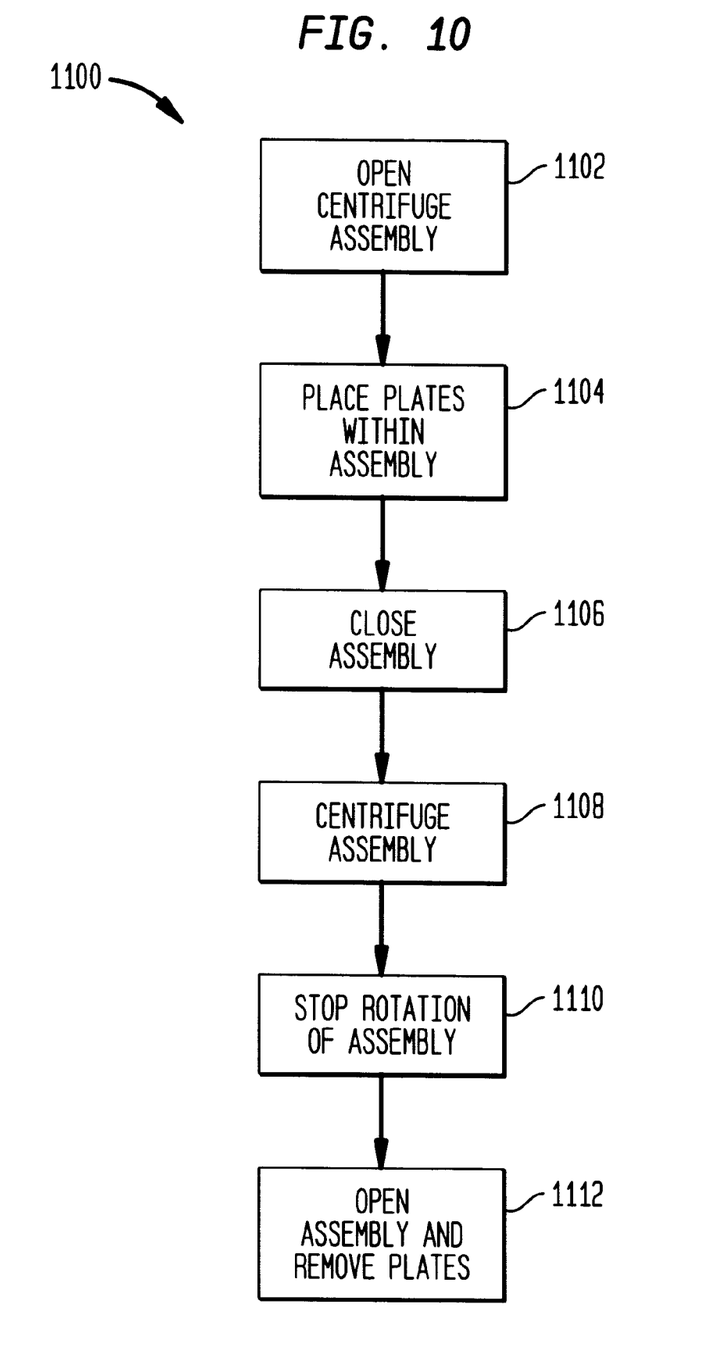
FIG. 10 illustrates the steps of a method of material transfer according to the present invention.

FIG. 10 illustrates the steps of a method 1100 of centrifugation according to the present invention. At step 1102, a centrifugation bucket is opened to receive a pair of multi-well transfer plates. The plates suitably include a source plate and a target plate. The plates each have a plurality of small wells and the source plate contains liquid within its wells. The surface tension of the liquid within the wells of the source plate exerts a force which tends to retain the liquid within the wells of the source plate unless overcome by a countervailing force. The centrifugation bucket may suitably be similar to the multiple-axis centrifugation bucket 900 of FIG. 8 and preferably includes a yoke adapted to pivot about an x axis parallel to the direction of travel of the centrifugation bucket and a platform connected to the yoke along a y axis perpendicular to the direction of travel of the centrifugation bucket. At step 1104, the pair of multi-well plates is placed within the centrifugation bucket. At step 1106, the centrifugation bucket is closed in order to secure the plates to the centrifugation bucket and exert a generally uniform pressure upon the plates. At step 1108, the centrifugation bucket is rotated about a central point to produce forces of centrifugation in order to achieve material transfer between the plates. The forces of centrifugation cause the yoke and the platform to pivot so that the transfer plates are maintained in a position nearly normal to the net force of centrifugation. At step 1110, the rotation of the centrifugation bucket is stopped. Finally, at step 1112, the centrifugation bucket is opened and the plates are removed for assays or other analysis or use.

The foregoing description of specific embodiments of the invention has been presented for the purposes of illustration and description. It is not intended to be exhaustive or to limit the invention to the precise forms disclosed, and many modifications and variations are possible in light of the above teachings and consistent with the claims which follow.

I claim:

1. A centrifugation bucket for use with a centrifuge in effecting material transfer between a source surface and a transfer surface, each of the source surface and the transfer surface being adapted to contain a plurality of small portions of a material to be transferred by centrifugation, the source surface being a microwell plate including a number of small wells, comprising:
   a yoke for connection to a rotor arm of the centrifuge, the yoke being adapted to pivot about a primary axis of rotation;
   a platform connected to the yoke, the platform being adapted to support the source surface and the transfer surface, the platform being adapted to pivot about a secondary axis of rotation independent of the primary axis of rotation.

2. The centrifugation bucket of claim 1 wherein the primary axis and the secondary axis are positioned such that the yoke and the platform respond to the forces of centrifugation by pivoting such that the net force of centrifugation is normal to the platform.

3. The centrifugation bucket of claim 2 wherein the primary axis is parallel to the direction of travel of the yoke and the secondary axis is perpendicular to the direction of travel of the yoke.

4. The centrifugation bucket of claim 3 wherein the primary axis is at the approximate center of inertia of the yoke.

5. The centrifugation bucket of claim 4 wherein the secondary axis is at the approximate center of inertia of the platform.

6. The centrifugation bucket of claim 5 wherein the transfer surface is a microwell plate containing a large number of small wells.

7. The centrifugation bucket of claim 6 wherein the centrifugation bucket is adapted to secure a compression assembly containing the source surface and the transfer surface, the compression assembly being adapted to exert pressure against the source surface and the transfer surface.

8. The centrifugation bucket of claim 5 wherein the transfer surface is a membrane for use in harvesting material from a microwell source plate.

9. The centrifugation bucket of claim 5 and also including a pressure plate for securing the source surface and the transfer surface against the platform, the pressure plate being adapted to exert a generally uniform pressure against the source surface and the transfer surface.

10. A method of centrifugation comprising the steps of:
    opening a centrifugation bucket to receive a pair of multi-well plates comprising a source plate and a target plate, the source plate and the target plate each including a plurality of small wells, the source plate containing a portion of liquid in each of one or more wells, each portion of liquid possessing a surface tension exerting a force tending to retain the liquid within the well, the centrifugation bucket including a yoke and a platform, the yoke being adapted to rotate about a first axis and the platform being adapted to rotate about a second axis independent from the first axis in order to maintain the forces of centrifugation in a direction normal to the multi-well plates;
    placing the source plate and the target plate within the centrifugation bucket;
    closing the centrifugation bucket to exert a generally uniform pressure on the source and target multi-well plates; and
    accelerating the centrifugation bucket about a central axis of rotation in order to produce forces of centrifugation upon the centrifugation bucket and thereby causing the yoke and the platform to pivot in response to the forces of centrifugation such that the multi-well plates are maintained in a position nearly normal to the net force of centrifugation.

11. The method of claim 10 wherein the yoke is caused to pivot in response to a normal component of the force of centrifugation and the platform is caused to pivot in response to a tangential component of the force of centrifugation.

12. The method of claim 11 wherein the first axis is a primary axis generally parallel to a direction of travel of the centrifugation bucket and the second axis is a secondary axis generally perpendicular to the direction of travel of the centrifugation bucket.

13. A method of centrifugation comprising the steps of:
    opening a centrifugation bucket to receive a source surface and a transfer surface, the source surface comprising a multi-well plate including a plurality of small wells, the source plate containing a portion of liquid in each of one or more wells, each portion of liquid possessing a surface tension exerting a force tending to retain the liquid within the well, the centrifugation bucket including a yoke and a platform, the yoke being adapted to rotate about a first axis and the platform being adapted to rotate about a second axis independent from the first axis in order to maintain the forces of centrifugation in a direction normal to source surface and the transfer surface;
    placing the source surface and the transfer surface within the centrifugation bucket;
    closing the centrifugation bucket to exert a generally uniform pressure on the source surface and the transfer surface; and accelerating the centrifugation bucket about a central axis of rotation in order to produce forces of centrifugation upon the centrifugation bucket and thereby causing the yoke and the platform to pivot in response to the forces of centrifugation such that the source surface and the transfer surface are maintained in a position nearly normal to the net force of centrifugation.

14. The method of claim 13 wherein the transfer surface is a multi-well plate including a number of small wells.

15. The method of claim 13 wherein the transfer surface is a membrane for use in harvesting material from a microwell source plate.

* * * * *